US010391954B2

(12) United States Patent
Westgarth et al.

(10) Patent No.: US 10,391,954 B2
(45) Date of Patent: Aug. 27, 2019

(54) VEHICLE TRIM PORTION CONNECTION BRACKET

(71) Applicant: Ford Global Technologies, LLC, Dearborn, MI (US)

(72) Inventors: Brian Westgarth, Billericay (GB); Ian Patterson, Billericay (GB); Jack Whitehurst, Leigh on Sea (GB); Rob Swann, Rayleigh (GB)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 15/782,261

(22) Filed: Oct. 12, 2017

(65) Prior Publication Data

US 2018/0105121 A1 Apr. 19, 2018

(30) Foreign Application Priority Data

Oct. 13, 2016 (GB) .................................. 1617384.1

(51) Int. Cl.
*B60R 13/02* (2006.01)
*B60R 13/04* (2006.01)

(52) U.S. Cl.
CPC .......... *B60R 13/0206* (2013.01); *B60R 13/04* (2013.01)

(58) Field of Classification Search
CPC ............................ B60R 13/0206; B60R 13/04
USPC ................................................ 296/155, 1.08
See application file for complete search history.

(56) References Cited

U.S. PATENT DOCUMENTS 4,505,611 A * 3/1985 Nagashima ......... B60R 13/0206 24/290
6,123,385 A * 9/2000 Bailey .................... B60J 5/0416 296/146.7
2008/0251667 A1* 10/2008 Swayne .............. B60R 13/0206 248/220.31
2009/0206630 A1 8/2009 Cavallin et al.
2009/0302627 A1* 12/2009 Onuma ............... B05B 13/0292 296/1.08
2014/0263895 A1 9/2014 Dickenson et al.
2016/0347372 A1 12/2016 Waskie et al.

* cited by examiner

*Primary Examiner* — Joseph D. Pape
(74) *Attorney, Agent, or Firm* — Burris Law, PLLC

(57) ABSTRACT

A vehicle trim portion connection bracket is provided. The bracket includes a first flange having a connecting portion configured to be coupled to a trim portion and a second flange configured to be coupled to a support member of the vehicle. The support member is configured to be coupled to a body of the vehicle. A relief slot is provided in the first flange and configured to reduce a load required to deform the connecting portion relative to a remaining portion of the first flange, such that the connecting portion may be deformed without disrupting the coupling between the bracket and the support member.

20 Claims, 3 Drawing Sheets

VEHICLE TRIM PORTION CONNECTION BRACKET

CROSS-REFERENCE TO RELATED APPLICATIONS

This application claims priority to and the benefit of GB 16178384.1 filed on Oct. 13, 2016. The disclosure of the above application is incorporated herein by reference.

FIELD

The present disclosure relates to connection bracket for connecting a trim portion to a vehicle and is particularly, although not exclusively, concerned with a connection bracket configured to allow a fit and finish of the trim portion to be improved.

BACKGROUND

The statements in this section merely provide background information related to the present disclosure and may not constitute prior art.

A motor vehicle often comprises a plurality of trim panels, e.g. interior trim panels. The trim panels may be arranged to cover an area of a body of the vehicle and/or one or more components of the vehicle that are fitted adjacent to the body, such that a portion of the body and/or the components are not visible to an occupant. In this way, the trim panels may be configured to improve the appearance of the interior of the vehicle, e.g. by providing an appearance that is uniform and uncluttered. Additionally or alternatively, the trim panel may be provided to protect components of the vehicle, e.g. by preventing the occupant or articles that have been loaded into the vehicle from contacting the components located beneath the trim panel.

The trim panels are often coupled to the body of the vehicle, e.g. a body frame of the vehicle, and are configured to sit against the body with a good fit, such that a gap between the trim panel and the vehicle body is minimized and is a consistent size along an edge of the trim panel adjacent to the vehicle body. When the trim portion is coupled directly to the vehicle body, ensuring a good fit between the trim panel and the body may be achieved using previously proposed methods. However, when the trim panel is not coupled directly to the vehicle body, for example, if the trim panel is supported by a bracket that is coupled to the vehicle body or another component of the vehicle, it may be challenging to maintain a consistent gap of a desired size between the trim panel and the vehicle body.

SUMMARY

According to an aspect of the present disclosure, there is provided a vehicle trim portion connection bracket comprising: a first flange having a connecting portion configured to be coupled to a trim portion; a second flange configured to be coupled to a support member of the vehicle, wherein the support member is configured to be coupled to a body of the vehicle; and a relief slot provided in the first flange and configured to reduce a load required to deform the connecting portion relative to a remaining portion of the first flange, such that the connecting portion may be deformed without disrupting, e.g. at least partially deforming, disconnecting, breaking or overloading, the coupling between the bracket and the support member.

The relief slot may be provided between the connecting portion and the remaining portion. The relief slot may extend along the length of a first side of the connecting portion. The relief slot may extend substantially the same length as the first side of the connecting portion or may extend a greater distance than the first side of the connecting portion.

The bracket may further comprise one or more additional relief slots extending along one or more further sides of the connecting portion. The additional relief slots may extend in a direction perpendicular to the relief slot. The additional relief slots may extend a distance less than the length of the further sides of the connecting portion, such that the connecting portion remains connected to the remaining portion of the first flange at the further sides of the connecting portion.

The connecting portion may be offset relative to the remaining portion of the first flange in a direction substantially perpendicular to the first flange, e.g. perpendicular to a plane in which the first flange is defined. The connecting portion and the remaining portion of the first flange may be parallel to and offset from one another. In other words, the connecting portion and the remaining portion may be defined by planes that are parallel to and offset from one another.

The connecting portion may comprise an opening. The connection bracket may be configured to be coupled to the trim portion at the opening. The opening may be formed by a stamping process. The stamping process may be a restriking process of the support member and/or connection bracket.

The bracket may further comprise a stiffening feature configured to resist deformation of the bracket, e.g. deformation of the first flange or the remaining portion of the first flange, relative to the second flange. The stiffening features may comprise gussets, webs, rib, corrugations, swages or any other stiffening features.

A vehicle trim portion connection assembly may comprise the above-mentioned vehicle trim portion connection bracket and the vehicle support member.

The connecting portion of the vehicle trim portion connection bracket may be formed relative to a datum of the support member when the trim portion connection bracket is coupled to the support member, e.g. such that a distance between the datum and the connecting portion is defined by a single manufacturing process. In other words, the vehicle trim portion connection bracket, the vehicle support member and/or the vehicle trim portion connection assembly may be manufactured such that a distance between the vehicle support member datum and the connecting portion may be subject to a single manufacturing tolerance.

The connecting portion of the vehicle trim portion connection bracket may be at least partially formed by a restriking process of the support member and the trim portion connection bracket, e.g. after the trim portion connection bracket has been coupled to the support member.

The support member may be a side load door track. The trim portion may be a side load door track cover.

A vehicle may comprise the above-mentioned vehicle trim portion connection bracket or the above-mentioned vehicle trim portion connection assembly.

According to another aspect of the present disclosure, there is provided a method of attaching a trim portion to a vehicle, the method comprising: providing a support member of the vehicle, the support member being configured to be coupled to a body of the vehicle; providing one or more trim portion connection brackets, the trim portion connection brackets comprising: a first flange having a connecting portion configured to be coupled to the trim portion; and a second flange; coupling the trim portion connection brackets to the support member at their respective second flanges; supporting the support member; deforming the connecting portions of the trim portion connection brackets into desired positions; and coupling the trim portion to the connecting portion of the trim portion connection brackets.

The support member may be supported at a datum of the support member. The desired positions of the connecting portions may be defined relative to the datum.

The step of deforming the connecting portions of the trim portion connection bracket may be achieved by performing a restrike operation of the support member and trim portion connection brackets.

The bracket may further comprise a relief slot provided in the first flange and configured to reduce a deformation force required to deform the connecting portion relative to a remaining portion of the first flange.

The method may further comprise providing an opening in each of the connecting portions of the trim portion connection brackets. The trim portion may be coupled to the trim portion connection brackets at the openings.

The openings may be provided during the same manufacturing operation in which the connecting portions of the trim portion connection brackets are deformed into the desired positions. Alternatively, the opening may be performed through a separate manufacturing process, which may be performed before or after the connecting portions are deformed into the desired positions.

The trim portion connection brackets may be coupled to the support member using a welding process, e.g. a spot welded process.

The method may further comprise coupling the support member to a body, e.g. a body frame, of the vehicle.

To avoid unnecessary duplication of effort and repetition of text in the specification, certain features are described in relation to only one or several aspects or forms of the present disclosure. However, it is to be understood that, where it is technically possible, features described in relation to any aspect or form of the present disclosure may also be used with any other aspect or form of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
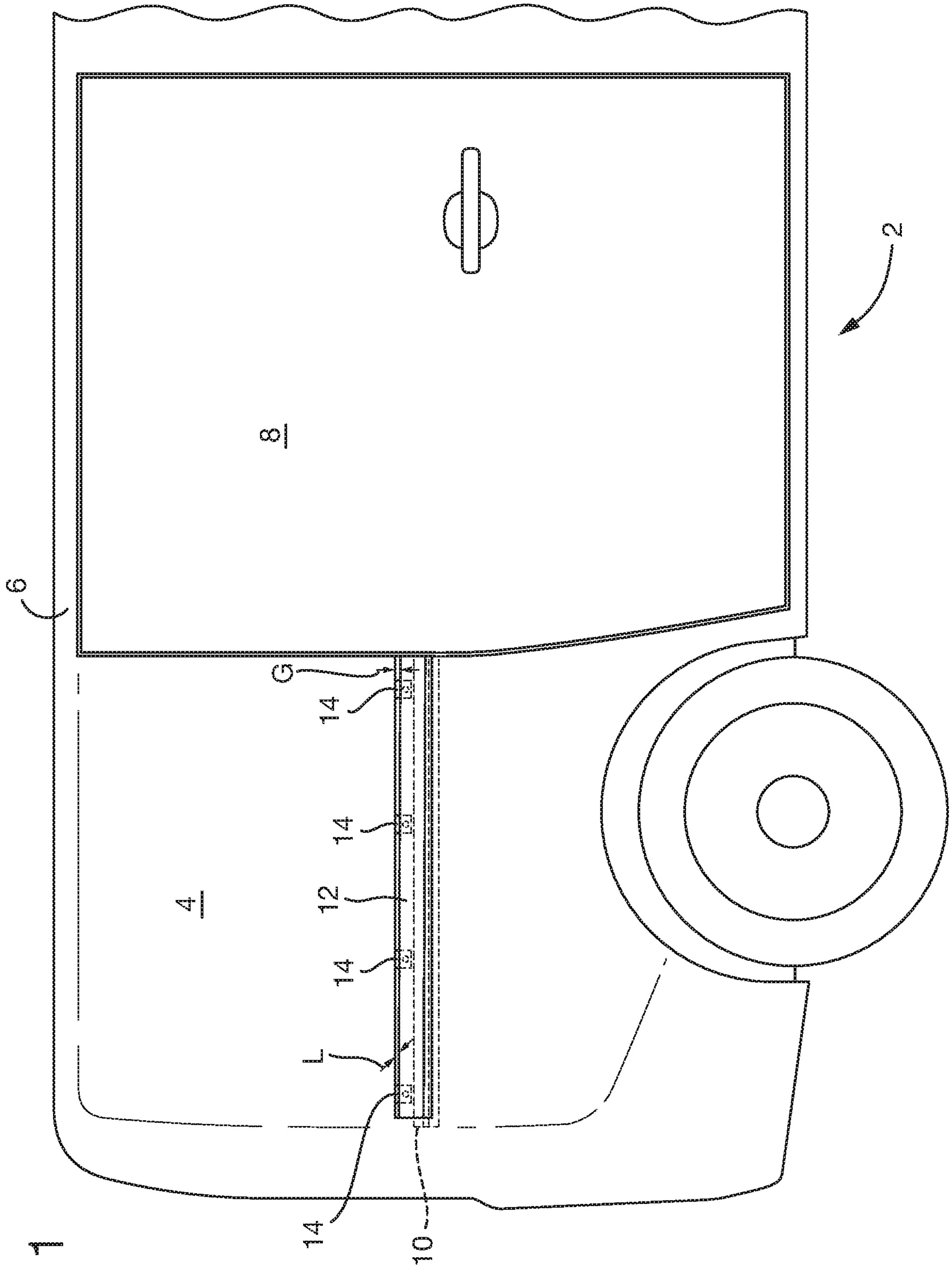
FIG. 1 shows a motor vehicle having a trim portion to which the principles of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 2, such as a motor vehicle, comprises a door frame panel 4, which forms part of a body 6 of the vehicle. The door frame panel 4 defines an opening for a side sliding door 8 of the vehicle, through which passengers and/or cargo can be loaded into the vehicle.

The vehicle 2 further comprises a side sliding door track 10 configured to support the side sliding door 8 and facilitate sliding of the door between an open position and a closed position. The vehicle 2 further comprises a side load door track cover 12, arranged to cover the side sliding door track 10, such that the full extent of the side sliding door track 10 and/or a sliding mechanism of the door is reduced from outside the vehicle. In other words, so that the door frame panel and side load door track cover 12 present a substantially uniform exterior appearance for the vehicle. Additionally, the cover 12 may protect the side sliding door track 10 and/or the sliding mechanism of the door from being damaged during use of the vehicle.

In the arrangement depicted in FIG. 1, the side sliding door track cover 12 is not coupled directly to the body 6 of the vehicle. Instead, the vehicle 2 comprises a plurality of brackets 14. The brackets 14 are configured to couple to the door frame panel 4 and to the cover 12 in order to support the cover 12 relative to the body 6 and the side sliding door track 10.

In the arrangement shown in FIG. 1, the brackets 14 and the sliding door track cover 12 are configured to cover a side sliding door track 10 provided at a central position of the sliding door 8. However, is it equally envisaged that the brackets 14 and/or cover 12 may be configured to cover a side sliding door track 10 provided at a top or bottom position of the side sliding door or at any other position between the top and bottom of the side sliding door.

Due to manufacturing tolerances inherent in the brackets 14 and/or in the method of assembling the brackets on to the body 6, a gap G is present between the body 6 and the cover 12. The gap G is provided so that the cover 12 does not collide with the body 6 when the cover 12, the brackets 14 and/or the body 6 have been manufactured and assembled to the most adverse tolerances permitted by the manufacturing specification of the vehicle. Additionally, a lip L may be formed between the cover 12 and a surface of the door frame panel 4, where the cover 12 is not flush with the door frame panel 4.

As the cover 12 is coupled to the body 6 using the brackets 14, a stack up of tolerances between the body 6 and the cover 12 may be greater than if the cover 12 were to be coupled directly to the body. In other words, there may be a greater number of relevant tolerances in the stack up of tolerances. Although the manufacturing and/or assembly tolerances may be reduced as much as practicable, in some cases, an adverse combination of tolerances may lead to the gap G and/or lip L being an undesirable size and/or to vary in size by an undesirable amount over the length of the cover 12.

In the arrangement depicted in FIG. 1, sufficient space is available within the vehicle 2 for the brackets 14 to be coupled to the door frame panel 4. However, in other arrangements, sufficient space may not be available. In this case, the brackets 14 may be coupled to the side sliding door track 10 or another support member of the vehicle, which may further increase the stack up of tolerances between the cover 12 and the body 6.

Figure 2:
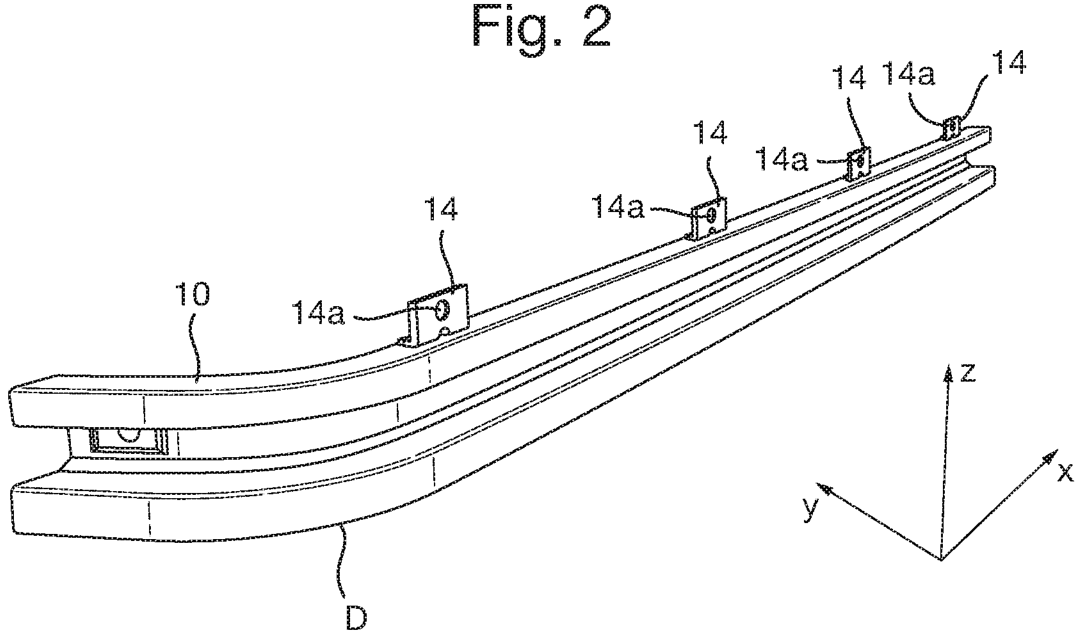
FIG. 2 shows a trim portion attachment assembly to which the principles of the present disclosure are applied.

With reference to FIG. 2, in order to reduce the stack up of tolerances between the cover 12 and the body 6, fixing holes 14*a* may be provided on the brackets 14 in a manufacturing stage performed after the brackets have been coupled to the support member, e.g. the side sliding door track 10. The cover 12 may be coupled to the brackets 14 at the fixing holes. As the fixing holes 14*a* are provided in the brackets 14 after the brackets 14 have been coupled to the support member, the height of the fixing holes, e.g. the position of the fixing holes in the "z" direction, may be defined relative to a datum D of the support member. Defining the height of the fixing holes in this way may reduce the manufacturing tolerances on the position of the fixing holes in this direction.

During the process of forming the fixing holes 14*a* in the brackets 14, the brackets may flex and/or deform in the "y" direction of the brackets. Any deformation, e.g. plastic deformation, of the bracket may reduce the manufacturing accuracy of the fixing holes in the "y" direction and any flexing, e.g. elastic deformation, of the bracket may lead to inaccuracies in the position of the fixing hole 14*a* in the "z" direction, as the brackets 14 may spring back towards a neutral, undeformed position after the fixing holes have been formed, affecting the final "z" position of the fixing holes. Hence, when the brackets 14 are coupled to a support member 10 of the vehicle, it may be challenging to control accurately the position of the fixing holes 14*a* in the "y" and "z" directions. It may therefore be challenging to control the fit between the cover 12 and the body 6 of the vehicle, e.g. the magnitude and consistency of the size of the gap G and the lip L.

Figure 3:
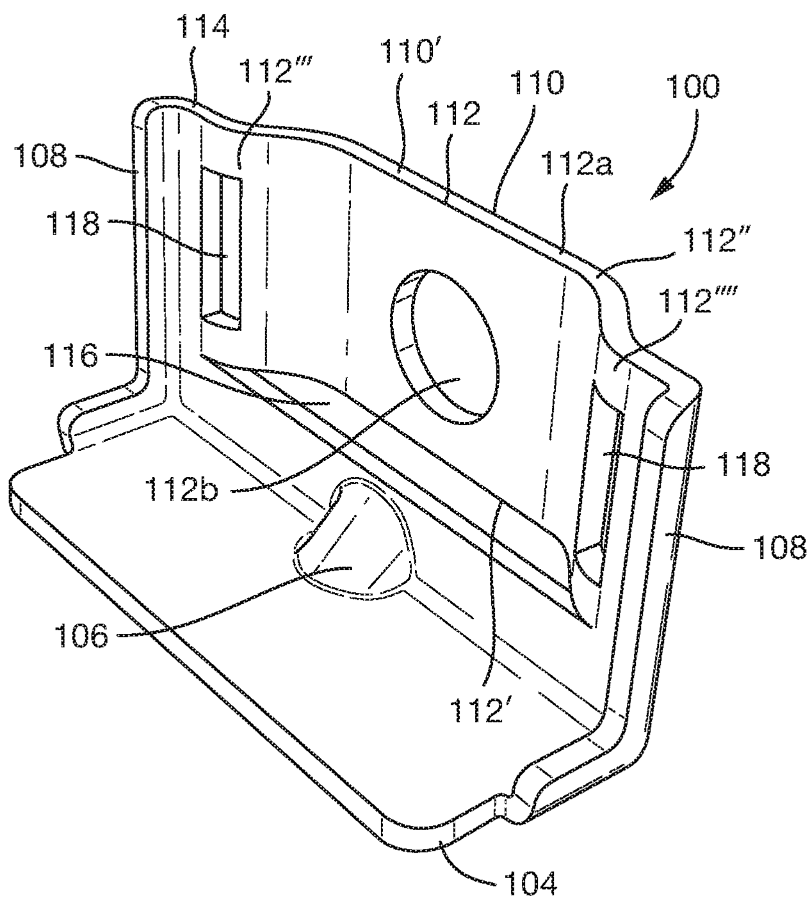
FIG. 3 shows a trim portion connecting bracket according to arrangements of the present disclosure.

With reference to FIG. 3, in order to improve the fit between the cover 12 and the body 6, a bracket 100, according to arrangements of the present disclosure, may be provided. The bracket 100 may be coupled to a support member of vehicle, such as side sliding door track 10 in the same way as the bracket 14 depicted in FIG. 2.

The bracket 100 comprises a first flange 110 having a connecting portion 112. The connecting portion 112 is configured to be coupled to a trim portion, such as the side sliding door track cover 12. The connecting portion 112 may define an interface surface 112*a*, which interfaces with a corresponding interface surface of the trim portion when the trim portion is coupled to the bracket. As shown in FIG. 3, the connecting portion 112 may be offset relative to a remaining portion 114 of the first flange in a direction perpendicular to the interface surface 112*a* of the connecting portion. In other words, the connecting portion 112 and the remaining portion 114 of the first flange may be formed in planes that are parallel to and offset from one another The bracket 100 further comprises a second flange 104 configured to be coupled to a support member of the vehicle 2, such as the side sliding door track 10. In the arrangement shown in FIG. 3, the bracket is configured to be coupled to the support member at the second flange using a welding process, such as a spot welding process. However, it is equally envisaged that the bracket, e.g. the second flange 104 of the bracket, may be configured to be coupled to the support member using fasteners, such as bolts, rivets or any other fastener, an adhesive or by any other suitable permanent or temporary joining method.

The first flange 110 and the second flange 104 may be planar, e.g. flat. However, it is equally envisaged that the first and or second flanges may be curved, bent, stepped or formed with any other desirable shape or profile. The shape of the first and second flanges 110, 104 may be configured to facilitate connection between the bracket and the trim portion and support member respectively.

The first and second flanges 110, 104 may be arranged at an angle relative to one another. For example, the first and second flanges 110, 104 may be substantially perpendicular to one another. Alternatively, the first and second flanges 110,104 may be arranged at any other desirable angle relative to one another. The angle between the first and second flanges 110,104 may be selected according to the design of the trim portion configured to be coupled to the first flange 110, the support member and/or the body of the vehicle at the location of the trim portion when fitted to the vehicle. The bracket may comprise a bend portion 102 between the first and second flanges 110, 104.

The bracket 100 further comprises a relief slot 116. The relief slot 116 is provided in the first flange 110. As depicted in FIG. 3, the relief slot 116 may be provided adjacent to the connecting portion 112. For example, the relief slot 116 may be provided along a first side 112' of the connecting portion 112 and may separate the connecting portion 112 from the remaining portion 114 of the first flange 110 along the first side 112'. The relief slot 116 may extend substantially the same length as the connecting portion or may extend a length greater than the length of the connecting portion first side 112'. In either case, the connecting portion 112 may be disconnected from the remaining portion 114 of the first flange along its first side 112' by the relief slot 116.

The relief slot 116 may be configured to permit the connecting portion 112 to be flexed or deformed, e.g. elastically or plastically deformed, relative to the remaining portion 114 of the first flange, without excessive loads being transferred into the first flange at the first side 112' of the connecting portion. Furthermore, by reducing the amount of material of the bracket 100 connecting the connecting portion 112 to the remaining portion 114 of the first flange, the load required to deform or flex the connecting portion 112 relative to the remaining portion 114 of the first flange may be reduced.

The connecting portion 112 extends from the relief slot 116 to a second side 112" of the connecting portion 112. In the arrangement depicted in FIG. 3, the second side 112" of the connecting portion 112 is at an edge 110' of the first flange. The connecting portion 112 is therefore disconnected from the remaining portion 114 of the first flange 110, or any other portion of the bracket 100, along two sides of the connecting portion 112. In other arrangements, the connecting portion 112 may not extend to the edge 110' of the first flange. In such arrangements, a second relief slot (not shown) may be provided and may extend along the length of the second side 112" of the connecting portion such that the connecting portion is disconnected from the remaining portion 114 of the first flange at the second side 112" of the connecting portion.

In the arrangement shown in FIG. 3, the connecting portion 112 is substantially rectangular in shape. As the connecting portion 112 is disconnected from the remaining portion 114 of the first flange 110, along two sides of the connecting portion 112, e.g. by virtue of the relief slot 116 and the edge of the flange 110', the first flange 110 may be deformed to change the offset between the connecting portion 112, e.g. the interface surface 112*a* of the connection portion, and the remaining portion 114 of the first flange, without distorting the connecting portion or the remaining portion 114 of the first flange, e.g. without disrupting their parallel relationship. In other arrangements of the present disclosure, the connecting portion may not be substantially square or rectangular and may have more or less than four sides. In such arrangements, further relief slots may be provided that extend along the length of further sides of the connecting portion as appropriate to allow the bracket to be deformed to change the offset between the connecting portion and the remaining portion 114 of the first flange without distorting the connecting portion 112.

As depicted in FIG. 3, the first flange 110 may further comprise one or more additional relief slots 118. The additional relief slots may extend along one or more further sides of the connecting portion 112, e.g. between the connecting portion and the remaining portion 114 of the first flange. The additional relief slots may be provided at one, several or each of the sides of the connecting portion at which the connecting portion is connected to the remaining portion 114 of the first flange. For example, in the arrangement shown in FIG. 3, the connecting portion is substantially rectangular. The connecting portion is disconnected from the remaining portion 114 of the first flange at first and second sides of the connecting portion and additional relief slots are provided at third and fourth sides of the connecting portion. The additional relief slots extend in a direction perpendicular to the first relief slot.

The additional relief slots 118 do not extend the full length of the further sides of the connecting portion 112, such that the connecting portion remains connected to the remaining portion 114 of the first flange at the sides where additional relief slots are provided. Providing the additional relief slots reduces the amount of material connecting the connecting portion 112 to the remaining portion 114 of the first flange, the load required to deform the connecting portion relative to the remaining portion 114 may therefore be reduced.

The bracket 100 further comprises one or more stiffening features, such as gussets 106 and/or ribs 108. In other arrangements of the disclosure, the bracket may additionally or alternatively comprise corrugations, swages, webs or any other stiffening features. In the arrangement shown in FIG. 3, the stiffening features are provided between the first flange 110 and the second flange 104 and are configured to increase the stiffness of the bracket, e.g. to increase the resistance of the bracket to deformation, e.g. plastic or elastic deformation, of the first flange 110 relative to the second flange 104. However, it is equally envisaged, that one or more stiffening features may be configured to increase the stiffness of the first flange or second flange themselves.

In order to couple the trim portion to the bracket 100, fixing holes 112*b* may be provided in the connecting portion 112 and the trim portion may be coupled to the bracket using a fastener, such as a bolt, rivet or any other fastener, which passes through the fixing hole 112*b* and the trim portion.

Figure 4:
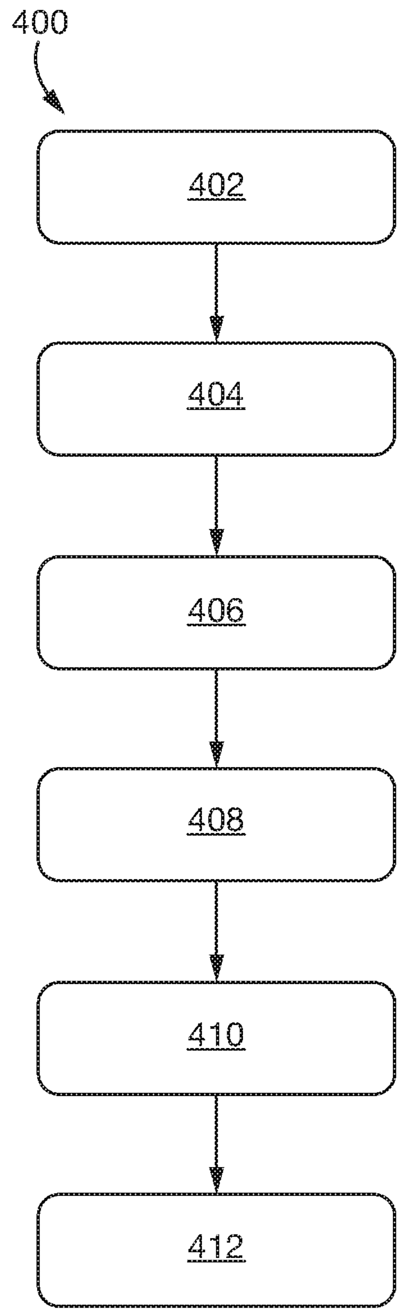
FIG. 4 shows a method of attaching a trim portion to a motor vehicle according to arrangements of the present disclosure.

With reference to FIG. 4, to reduce manufacturing tolerances between the trim portion and the body, the trim portion, brackets, and support member may be assembled using a method 400, according to arrangements of the present disclosure.

The method 400 comprises a first step 402, in which the support member of the vehicle is provided, the support member may be a sheet metal component and/or may be manufactured using a forming process, such as stamping pressing or forging. Alternatively, the support member may be a machined or fabricated component. In a second step 404 of the method one or more of the brackets 100 are provided and in a third step 406, the brackets are coupled to the support member. As described above, the brackets may be coupled to the support member using a welding process, such as a spot welding process.

When the bracket is being coupled to the support member, the position of the connecting portion 112 may be controlled relative to a datum of the support member. In this case, the position of the connecting portion may include a single manufacturing tolerance in a stack of tolerances between the support member datum and the connecting portion 112 of the bracket 100. However, in other arrangements, when the bracket is being coupled to the support member the position of the bracket may be set relative to alternative features of the bracket 100 and/or the support member. For example, the position of the bracket may be set by positioning the second flange 104 of the bracket relative to a coupling surface of the support member that is separated from the datum. In this case, there may be three or more manufacturing tolerances in the stack of tolerances between the datum of the support member and the connecting portion. Hence, following the third step 406 of the method 400, the accuracy of the position of the connecting portion 112 may be less than a desired accuracy.

In a fourth step 408 of the method 400, the support member is supported, e.g. using a jig configured to support the support member, relative to a manufacturing tool, such as a stamping or pressing tool. The support member may be supported at the datum of the support member.

In a fifth step 410, the connecting portion of the brackets are deformed into desired positions, e.g. relative to the datum of the support member. The fifth step 410 may be a restriking operation of the support member and/or brackets, e.g. using a stamping or forging tool, which repositions one or more surfaces of the support member and/or brackets into desirable locations. In particular, as mentioned above, the restriking operation may be performed to deform the connecting portions 112 of the brackets 100, into desired positions.

As described above, in the fourth step 408 the support member may be supported relative to a manufacturing tool. Deformation of the connecting portions in the fifth step may be performed using the manufacturing tool. Performing the restrike operation may therefore allow the accuracy of the positions of the connecting portions 112 relative to the datum to be improved. For example, following the restrike operation, the stack of tolerances between the support member datum and the connecting portion 112 may include a single tolerance, e.g. a tolerance inherent in the restriking process.

In many cases, it may be undesirable to perform a restrike operation on a component or assembly including a welded joint, particularly if it desirable to change the relative position of features on both sides of the joint as is the case in the method 400. However, by configuring the bracket 100 and the connecting portion 112 as descried above with reference to FIG. 3, the force required to deform the connecting portion 112 of the bracket 100 relative to the first and second flanges 110, 104 may be reduced compared to previously proposed brackets. This may reduce the load on the joint between the bracket 100 and the support member. Additionally, the stiffening features 106, 108 may strengthen the bracket against deformations of the bracket 100 itself. Such deformations may otherwise disrupt, e.g. break, overload or partially disconnect, the joint between the bracket and the support structure.

In a sixth step 412, the trim portion may be coupled to connecting portions 112 of the brackets. As described above, the trim portion may be coupled to the brackets at a fixing hole 112*b* provided in the connecting portion of the bracket.

The method 400 may comprise an additional step in which the fixing holes are formed in the connecting portions of the brackets.

The fixing holes may be formed using a stamping process. In some arrangements of the disclosure, the fixing holes 112*b* may be formed during the same manufacturing process by which the connecting portions are deformed into desirable positions, e.g. during the fifth step 410. In other words, restriking of the support member and/or brackets 100, and stamping of the fixing holes 112*b* may be performed through the same manufacturing process. In this way, the positions of the connecting portions 112 may be accurately controlled whilst the fixing holes 112*b* are being provided. Hence, the connecting portions 112 may not be undesirably deformed, e.g. elastically deformed, by the process of providing the fixing holes and may not return to an undeformed position after the fixing holes have been formed. The accuracy of the positions of the fixing holes may therefore be improved.

The support member may be coupled to the vehicle, e.g. to the body of the vehicle. In some arrangements, the support member may be coupled to the body at the datum of the support member. The support member may be couple to the vehicle 2 before or after the trim portion has been coupled to the bracket 100.

It will be appreciated by those skilled in the art that although the present disclosure has been described by way of example, with reference to one or more exemplary examples, it is not limited to the disclosed examples and that alternative examples could be constructed without departing from the scope of the present disclosure as defined by the appended claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle trim portion connection bracket comprising:
- a first flange having a connecting portion configured to be coupled to a trim portion;
- a second flange configured to be coupled to a support member of a vehicle, wherein the support member is configured to be coupled to a body of the vehicle; and
- a relief slot provided in the first flange and configured to reduce a load required to deform the connecting portion relative to a remaining portion of the first flange, such that the connecting portion deforms without disrupting the coupling between the vehicle trim portion connection bracket and the support member.

2. The vehicle trim portion connection bracket of claim 1, wherein the relief slot extends along a length of a first side of the connecting portion of the first flange.

3. The vehicle trim portion connection bracket of claim 1, wherein the bracket further comprises at least one additional relief slot extending along at least one side of the connecting portion.

4. The vehicle trim portion connection bracket of claim 1, wherein the connecting portion is offset relative to the remaining portion of the first flange in a direction substantially perpendicular to the first flange.

5. The vehicle trim portion connection bracket of claim 1, wherein the connecting portion of the first flange comprises an opening, wherein the connection bracket is configured to be coupled to the trim portion at the opening.

6. The vehicle trim portion connection bracket of claim 5, wherein the opening is formed by a stamping process.

7. The vehicle trim portion connection bracket of claim 1 further comprising a stiffening feature configured to resist deformation of the first flange of the bracket relative to the second flange.

8. A vehicle trim portion connection assembly comprising the vehicle trim portion connection bracket according to claim 1 and a vehicle support member.

9. The vehicle trim portion connection assembly according to claim 8, wherein the connecting portion of the vehicle trim portion connection bracket is formed relative to a datum of the vehicle support member when the trim portion connection bracket is coupled to the vehicle support member.

10. The vehicle trim portion connection assembly according to claim 8, wherein the connecting portion of the vehicle trim portion connection bracket is at least partially formed by a restriking process of the vehicle support member and the trim portion connection bracket.

11. The vehicle trim portion connection bracket according to claim 1, wherein the vehicle support member is a side load door track.

12. The vehicle trim portion connection bracket according to claim 1, wherein the trim portion is a side load door track cover.

13. A vehicle comprising the vehicle trim portion connection bracket of claim 1.

14. A method of attaching a trim portion to a vehicle, the method comprising:
- providing a support member of the vehicle;
- the support member being configured to be coupled to a body of the vehicle;
- providing at least one trim portion connection bracket, the trim portion connection bracket comprising:
  - a first flange having a connecting portion configured to be coupled to the trim portion; and
  - a second flange;
- coupling the at least one trim portion connection bracket to the support member at the second flange of the at least one trim portion connection bracket;
- supporting the support member;
- deforming the connecting portion of the at least one trim portion connection bracket into desired positions; and
- coupling the trim portion of the vehicle to the connecting portion of the at least one trim portion connection bracket.

15. The method of claim 14, wherein the vehicle support member is supported at a datum of the vehicle support member and wherein the desired position of the connecting portion of the at least one trim portion connection bracket is defined relative to the datum.

16. The method of claim 14, wherein the step of deforming the connecting portions of the at least one trim portion connection bracket is achieved by performing a restrike operation of the vehicle support member and the at least one trim portion connection bracket.

17. The method of claim 14, wherein the at least one trim portion connection bracket further comprises a relief slot provided in the first flange and configured to reduce a deformation force required to deform the connecting portion relative to a remaining portion of the first flange.

18. The method of claim 14 further comprising the step of:
- providing an opening in each of the connecting portions of the at least one trim portion connection bracket, wherein the trim portion is coupled to the at least one trim portion connection bracket at the opening.

19. The method of claim 18, wherein openings are provided during a same manufacturing operation in which the connecting portions of the at least one trim portion connection bracket is deformed into the desired position.

20. The method of claim 14, wherein the at least one trim portion connection bracket is coupled to the vehicle support member by a welding process.

* * * * *